United States Patent
Mamura et al.

(10) Patent No.: US 9,413,913 B2
(45) Date of Patent: Aug. 9, 2016

(54) PAPER TYPE DETECTION APPARATUS AND METHOD FOR DETECTING PAPER TYPE

(71) Applicant: KYOCERA Document Solutions Inc., Osaka-shi, Osaka (JP)

(72) Inventors: Toshiki Mamura, Osaka (JP); Keisuke Isoda, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/666,331

(22) Filed: Mar. 24, 2015

(65) Prior Publication Data

US 2015/0281492 A1   Oct. 1, 2015

(30) Foreign Application Priority Data

Mar. 28, 2014   (JP) .................................. 2014-67846

(51) Int. Cl.
*G06F 3/12* (2006.01)
*H04N 1/00* (2006.01)
*H04N 1/04* (2006.01)

(52) U.S. Cl.
CPC ....... *H04N 1/00779* (2013.01); *H04N 1/00716* (2013.01); *H04N 1/00724* (2013.01); *H04N 1/00726* (2013.01); *H04N 2201/0094* (2013.01)

(58) Field of Classification Search
CPC .......... H04N 1/00352; H04N 1/00411; H04N 1/00413; H04N 1/0413; H04N 1/00432; H04N 1/00482; H04N 1/00681; H04N 1/00779; H04N 1/00716; H04N 1/00724; H04N 1/00726; H04N 2001/0094; H04N 2201/0098
USPC ............... 358/1.1, 1.9, 1.13, 1.14, 1.15, 1.18, 358/448, 498; 399/45
See application file for complete search history.

(56) References Cited

U.S. PATENT DOCUMENTS

| | | | | |
|---|---|---|---|---|
| 5,973,797 | A  * | 10/1999 | Tanaka ............... | H04N 1/00681 358/449 |
| 2011/0020021 | A1 * | 1/2011 | Murakami ......... | H04N 1/00352 399/45 |
| 2013/0301067 | A1 * | 11/2013 | Nakamura ......... | H04N 1/00037 358/1.13 |

FOREIGN PATENT DOCUMENTS

| | | |
|---|---|---|
| JP | 07015586 A | 1/1995 |
| JP | 2001301273 A | 10/2001 |

* cited by examiner

*Primary Examiner* — Gabriel Garcia (57) ABSTRACT

A paper type detection apparatus includes a surface-property detection unit, a thickness detection unit, and a paper-type setting unit. The surface-property detection unit detects a surface property of paper by performing image processing on image data of the paper read by an image reading unit. The thickness detection unit causes the image reading unit to read the image data of the paper over which a reference chart with a predetermined black density is laid. The thickness detection unit detects the thickness of the paper based on the difference between the black density of the reference chart and the black density appearing on the image data through the paper. The paper-type setting unit sets the type of the paper associated with the detected surface property and thickness of the paper.

4 Claims, 7 Drawing Sheets

| SURFACE PROPERTY 701 | THICKNESS 702 | TYPE 703 |
|---|---|---|
| ROUGHEST LEVEL | THICKEST LEVEL | A |
| ROUGH LEVEL | | B |
| FINE LEVEL | | C |
| FINEST LEVEL | | D |
| ... | ... | ... |

← 700

PAPER TYPE DETECTION APPARATUS AND METHOD FOR DETECTING PAPER TYPE

INCORPORATION BY REFERENCE

The disclosure of Japanese Patent Application No. 2014-67846 filed on Mar. 28, 2014 including the specification, drawings and abstract is incorporated herein by reference in its entirety.

BACKGROUND

This disclosure relates to a paper type detection apparatus and a method for detecting the type of paper.

Image forming apparatuses, such as multifunction peripherals, having a function of identifying the type of paper used for printing can optimize the settings of an imaging unit and paper transportation, thereby improving the quality of output images. Thus, such paper type identification has been recommended.

In general, users acquire paper type information from the wrapping paper of a package of paper and select the acquired paper type through an operating panel to perform paper type identification on the image forming apparatus.

A well-known technique of identifying the type of paper uses a media sensor mounted along a paper transport path to detect surface roughness or other paper surface properties for paper type identification. Also, there is a known technique of identifying the thickness of paper based on the amount of displacement of a roller pushed up by the paper conveyed immediately under the roller. The roller is disposed along a paper transport path or on an automatic carriage.

As described above, there are some methods by which an image forming apparatus identifies the type of paper in addition to the method that a user inputs the type of paper.

SUMMARY

In an aspect of the present disclosure, a paper type detection apparatus includes a surface-property detection unit, a thickness detection unit, and a paper-type setting unit. The surface-property detection unit detects a surface property of paper by performing image processing on image data of the paper read by an image reading unit. The thickness detection unit causes the image reading unit to read image data of the paper over which a reference chart having a predetermined black density is laid. The thickness detection unit detects the thickness of the paper based on the difference between the black density of the reference chart and the black density appearing on the image data through the paper. The paper-type setting unit sets the type of the paper associated with the detected surface property and thickness of the paper.

In another aspect of the disclosure, a method for detecting the type of paper includes detecting a surface property of the paper, detecting the thickness of the paper, and setting the type of the paper. In detecting a surface property of the paper, the surface property is detected by performing image processing on image data of the paper read by an image reading unit. In detecting the thickness of the paper, the image reading unit reads the image data of the paper over which a reference chart having a predetermined black density is laid. In detecting the thickness of paper, the thickness of the paper is detected based on the difference between the black density of the reference chart and the black density appearing on the image data through the paper. In setting the type of the paper, the type of the paper associated with the detected surface property and thickness of the paper is set.

DETAILED DESCRIPTION

With reference to the accompanying drawings, an embodiment of the image forming apparatus according to the present disclosure will be described for further understanding of the disclosure. It should be noted that the embodiment described below is a mere example of implementation of the present disclosure, and in no way restricts the technical scope of the disclosure. The alphabetic script "S" attached before a numeral in the flowchart denotes "step".

<Image Forming Apparatus>

Figure 1:
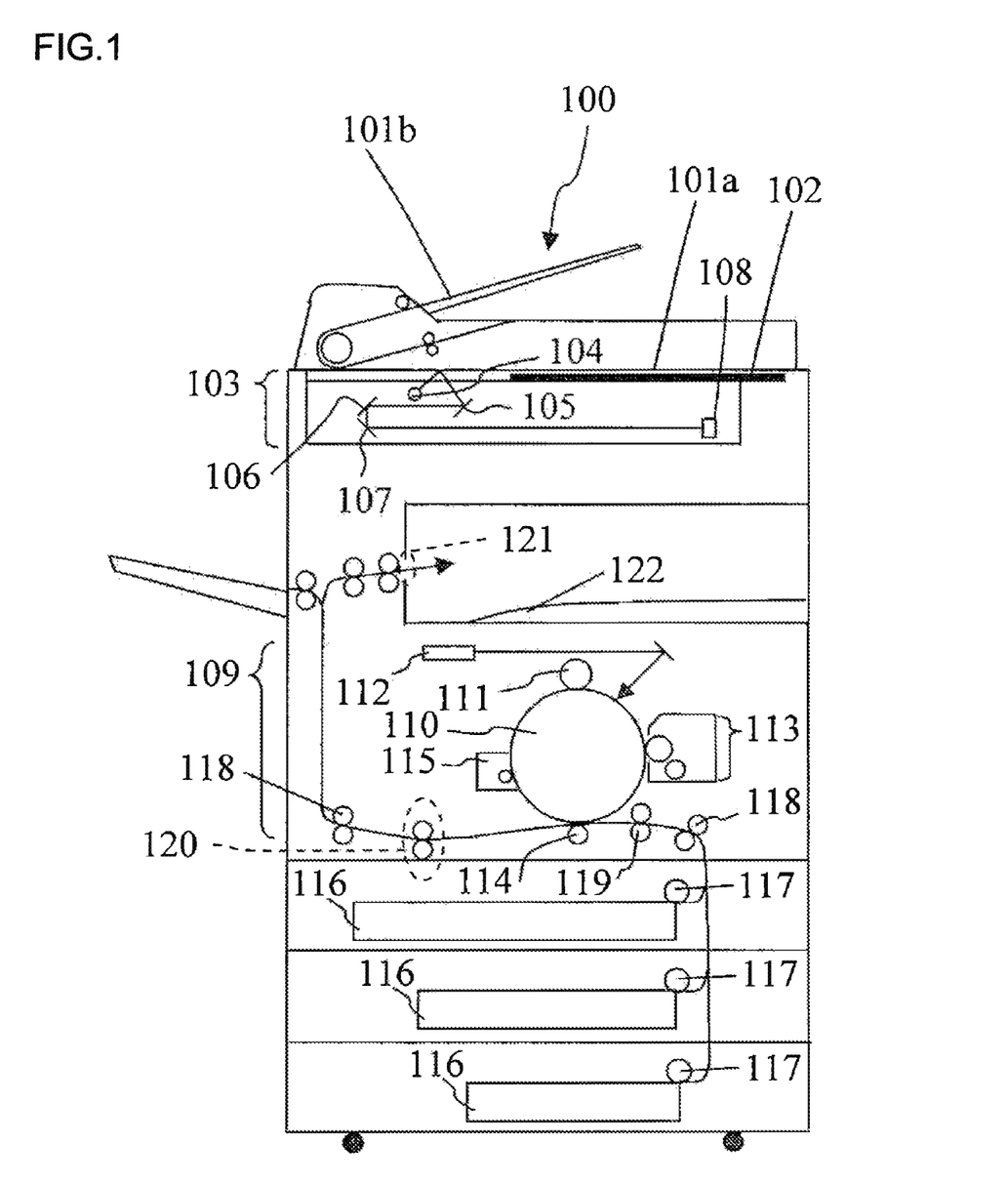
FIG. 1 is a conceptual diagram illustrating the entire internal configuration of a multifunction peripheral according to the present disclosure.

The image forming apparatus according to an embodiment of the present disclosure is, for example, a general image forming apparatus, which will be described below. FIG. 1 is a simple schematic diagram of the image forming apparatus according to the embodiment of the disclosure. Note that details of units not directly relating to this disclosure are omitted.

The image forming apparatus of this disclosure may be, for example, a standalone printer or scanner, or a multifunction peripheral equipped with a printer, a copier, a scanner, a facsimile, etc., which works as an image forming apparatus having a copy function, a scanner function, a facsimile function, a printer function, etc.

The following is a brief description about the operation of a multifunction peripheral (MFP) 100 performing, for example, a copy function.

When a user uses the MFP 100, the user firstly places an original document on a document table 101*a* or an input tray 101*b* of an automatic document feeding unit, both being provided on an upper part of an MFP body. Subsequently, the user operates an operating unit 102 (operating panel) provided near the document table 101*a* to input setting conditions relating to image formation through an operation screen (initial screen) on the operating unit 102. Then, the user depresses a start key provided in the operating unit 102 to cause the MFP 100 to start image formation (printing process).

In an image reading unit 103, light emitted from a light source 104 is reflected on the original document placed on the document table 101*a*. The reflected light is guided by mirrors 105, 106, 107 to an image pickup device 108. The guided light is photoelectrically converted by the image pickup device 108 to generate image data corresponding to the original document.

An image forming unit 109 forms a toner image based on the image data. The image forming unit 109 includes a photoconductive drum 110. The photoconductive drum 110 rotates at a constant speed in a preset direction and is surrounded by a charging device 111, an exposure unit 112, a developing device 113, a transferring device 114, a cleaning unit 115 and some other components disposed in this order from the upstream side along the rotating direction.

The charging device 111 uniformly charges the surface of the photoconductive drum 110. The exposure unit 112 irradiates the charged surface of the photoconductive drum 110 with laser light based on the image data to form an electrostatic latent image. The developing device 113 applies toner onto the electrostatic latent image to form a toner image. The formed toner image is transferred by the transferring device 114 onto a recording medium (ex. a sheet of paper). The cleaning unit 115 removes excess toner left on the surface of the photoconductive drum 110. This series of processes is executed by rotating the photoconductive drum 110.

The sheet of paper is transported from a plurality of paper cassettes 116 provided in the MFP 100. Before being transported, the sheet of paper is pulled out by a pickup roller 117 from any one of the paper cassettes 116. The respective paper cassettes 116 accommodate different types of paper sheets and supply the sheets in accordance with the setting conditions for image formation.

The sheet of paper, which was pulled out to a transport path, is inserted between the photoconductive drum 110 and transferring device 114 by transport rollers 118 and resist rollers 119. The inserted sheet of paper receives the toner image from the transferring device 114 and is transported to a fuser 120.

While the sheet of paper on which the toner image has been transferred passes between a heating roller and a pressure roller provided in the fuser 120, heat and pressure are applied to the toner image to fix the visible image on the sheet of paper. The amount of heat generated by the heating roller is optimally set in accordance with the type of paper to achieve appropriate fixation. Fixing the visible image on the sheet of paper completes the image formation, and the sheet of paper is then ejected by the transport rollers 118 through an output port 121 to an inner tray 122 formed in the middle of the MFP body. The sheet of paper is stacked and accommodated on the inner tray 122. Through the above-described procedure, the MFP 100 provides its copy function to the user.

Figure 2:
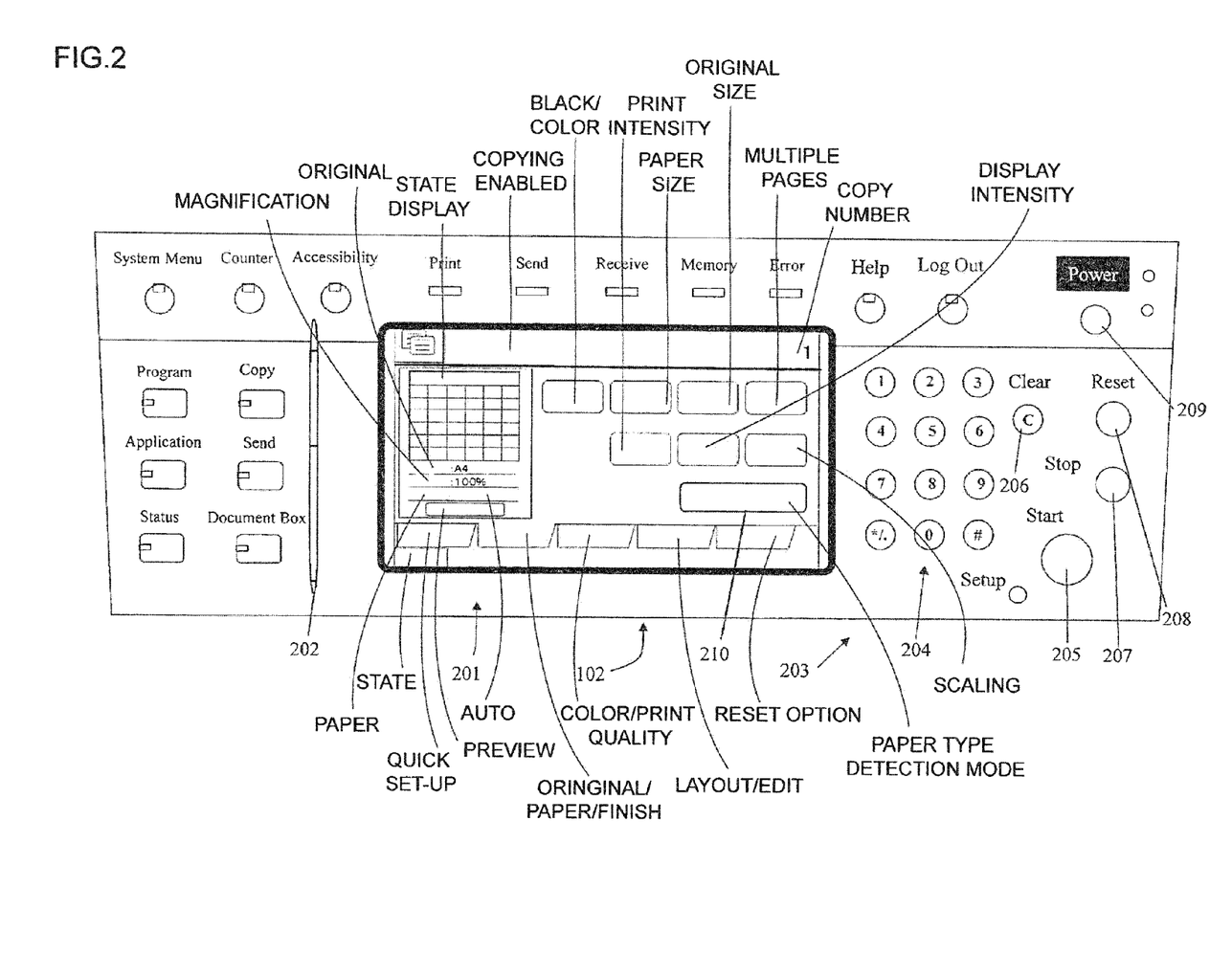
FIG. 2 is a conceptual diagram illustrating the entire configuration of an operating unit according to the disclosure.

FIG. 2 is a conceptual diagram illustrating the entire configuration of the operating unit 102 according to the embodiment of the present disclosure. A user inputs setting conditions for image formation as described above and confirms the input setting conditions through the operating unit 102. In order to input the setting conditions, the user manipulates a touch panel 201 (operating panel), a stylus pen 202, and operational keys 203 provided on the operating unit 102.

The touch panel 201 has both a function of inputting setting conditions and a function of displaying the setting conditions. Specifically, depressing a key within a screen displayed on the touch panel 201 enables input of a setting condition associated with the depressed key.

On the back side of the touch panel 201, there is provided a display unit (not shown), such as a liquid crystal display (LCD), that displays operation screens including, for example, an initial screen. The stylus pen 202 is placed in the vicinity of the touch panel 201. If the user brings the tip of the stylus pen 202 into contact with the touch panel 201, a sensor provided under the touch panel 201 detects the contact point.

In addition, there are a predetermined number of operational keys 203 in the vicinity of the touch panel 201, such as a numeric keypad 204, a start key 205, a clear key 206, a stop key 207, a reset key 208, and a power key 209.

Figure 3:
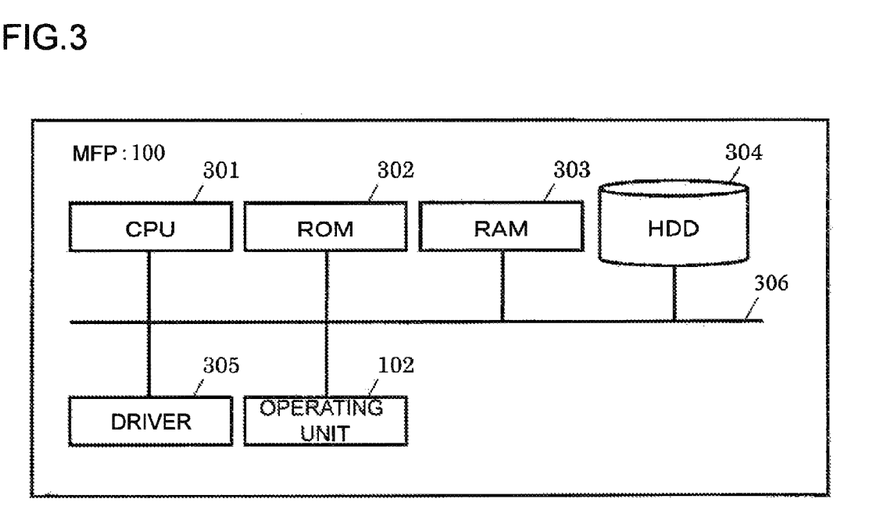
FIG. 3 shows the configuration of control system hardware in the multifunction peripheral according to the disclosure.

With reference to FIG. 3, description will be made about the configuration of control system hardware in the MFP 100. FIG. 3 shows the configuration of the control system hardware in the MFP 100 according to the present disclosure. Note that details of units not directly relating to this disclosure are omitted.

A control circuit of the MFP 100 is composed of a central processing unit (CPU) 301, a read only memory (ROM) 302, a random access memory (RAM) 303, a hard disk drive (HDD) 304, a driver 305 associated with each driving unit, and an operating unit 102, which are connected to one another by an internal bus 306.

The CPU 301, for example, uses the RAM 303 as a work area. The CPU 301 executes programs stored in the ROM 302, HDD 304, or other storage devices to control the operation of the respective driving units shown in FIG. 1 by exchanging data and instructions from the driver 305 and the operating unit 102 and signals and commands corresponding to keys based on the execution results.

In addition to the aforementioned driving units, the MFP 100 includes other units (see FIG. 4), which will be described later, and also implements the units by causing the CPU 301 to execute programs. The ROM 302, HDD 304 and other storage devices contain programs and data used to implement the units that will be described later.

<Embodiment of the Enclosure>

Figure 4:
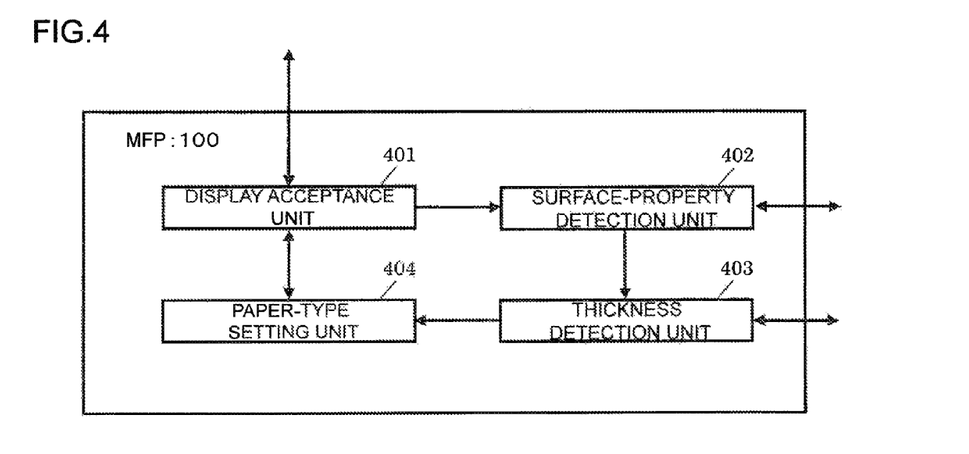
FIG. 4 is a functional block diagram of the multifunction peripheral according to an embodiment of the disclosure.
Figure 5:
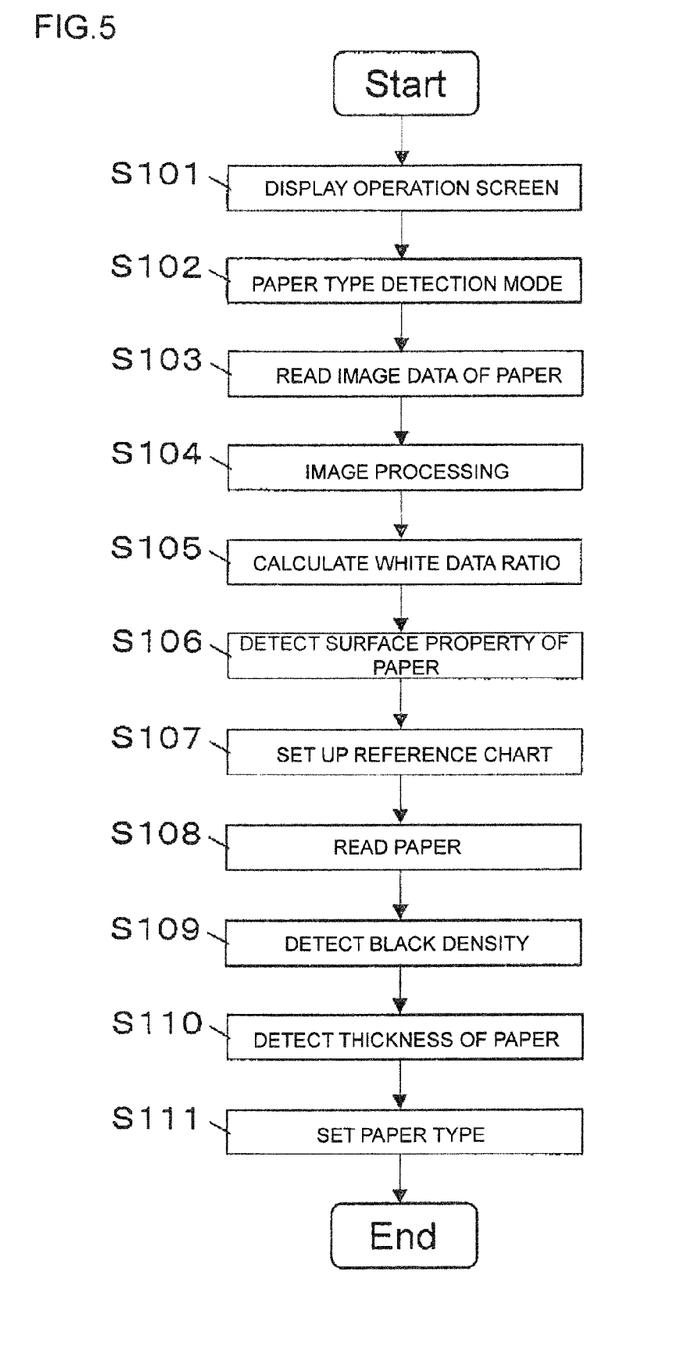
FIG. 5 is a flow chart describing an operational procedure according to the embodiment of the disclosure.

Referring to FIGS. 4 and 5, descriptions will be given about the configuration and execution procedure according to the embodiment of the present disclosure. FIG. 4 is a functional block diagram of the MPF of this disclosure. FIG. 5 is a flow chart describing the execution procedure of this disclosure.

Once a user turns on an MFP 100, the MFP 100 starts up and a display acceptance unit 401 displays an operation screen on a touch panel 201 as shown in FIG. 2 (FIG. 5: S101).

On the operation screen, a paper-type detection mode key 210 is displayed in addition to keys used to input setting conditions. The paper-type detection mode key 210 is selectable to detect the type of paper.

If the user selects the paper-type detection mode key 210 while viewing the operation screen, the display acceptance unit 401 accepts the selection of the paper-type detection mode key 210 (FIG. 5: S102) and notifies a surface-property detection unit 402 that the paper-type detection mode key 210 has been selected. The surface-property detection unit 402 receives the notification and performs image processing on image data of paper read by an image reading unit 103 to detect a surface property of the paper.

The surface-property detection unit 402 detects the surface property of paper by, for example, the following method. Specifically, the surface-property detection unit 402 firstly displays an image reading screen, which is used to read image data of paper, on the touch panel 201 to prompt the user to perform reading of image data of the paper.

While viewing the image reading screen, the user places a sheet of paper whose type the user wants to detect on a document table 101a and then instructs the MFP 100 to read out image data through key operations. The surface-property detection unit 402 receives the instruction and then reads the image data of the paper by using the image reading unit 103 (scanner) (FIG. 5: S103).

Figure 6A:
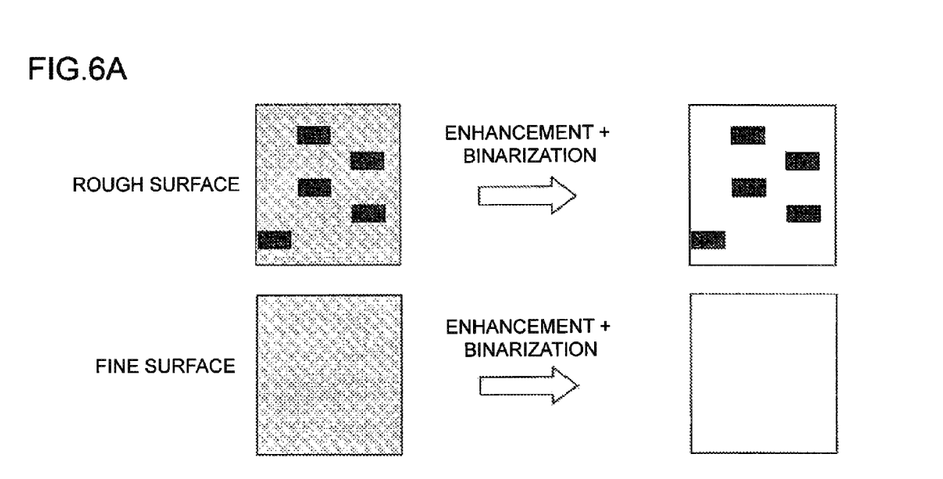
FIG. 6A illustrates the relationship between image processing and surface properties of paper.

Upon completion of image data reading, the surface-property detection unit 402 performs predetermined image processing on the image data (FIG. 5: S104). The image processing herein may be any type of processing enabling detection of the surface properties. For example, the surface-property detection unit 402 performs a (contrast) enhancement process on the image data of the paper and an image binarization process to transform the enhanced image data into a binary representation. After the enhancement and binarization processes, black data (black pixel data) randomly appears over the image data if it is on paper with rough surfaces, but hardly appears over the image data if it is on paper with fine surfaces as shown in FIG. 6A. Utilizing this phenomenon, the surface-property detection unit 402 determines by calculations the ratio of white data (white pixel data) to the image data subjected to the image processing (FIG. 5: S105), and associates the determined ratio of the white data with one of a plurality of ranges (table), which indicate preset surface properties of paper in a stepwise manner, thereby detecting (deciding) the surface property of the paper (FIG. 5: S106).

For example, a white data ratio of less than 80% is associated with a range called a "roughest level" denoting that the surface of the paper is the roughest, a white data ratio from 80% to 90% is associated with a range called "rough level" denoting that the surface of the paper is relatively rough, a white data ratio from 90% to 95% is associated with a range called "fine level (even level)" denoting that the surface of the paper is relatively fine, and a white data ratio from 95% to 100% is associated with a range called "finest level (most even level)" denoting that the surface of the paper is the finest.

The surface-property detection unit 402 associates the calculated ratio of white data with a ratio in a range and determines the surface property assigned to the ratio in the range as the surface property of the paper. This enables detection of the surface property of paper only by performing image processing without using media sensors or the like.

After completing the detection of paper surface property, the surface-property detection unit 402 notifies a thickness detection unit 403 that the surface property has been detected. The thickness detection unit 403 receives the notification and causes the image reading unit 103 to read image data of the paper over which a reference chart having a predetermined black density is laid. The thickness detection unit 403 detects the thickness of the paper based on the difference between the black density of the reference chart and the black density appearing on the image data through the paper.

The thickness detection unit 403 detects the thickness of the paper by, for example, the following method. Firstly, the thickness detection unit 403 displays a reference chart screen, which is designed to set up a reference chart, on the touch panel 201 to prompt the user to set up the reference chart over the paper.

Figure 6B:
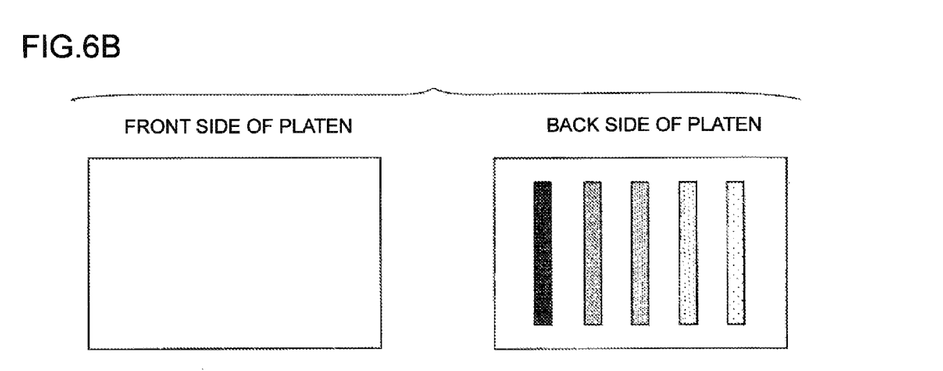
FIG. 6B shows an example of a platen used as a reference chart.

The reference chart can be implemented in any manner. For example, the reference chart is composed of a platen, as shown in FIG. 6B, that faces the document table 101a and includes a white plate on the front side usually used to read image data of an original document and a white plate on the back side on which a pattern of predetermined black density (patch, bar, or the like) is rendered. The reference chart used herein provides patterns of black densities increasing in five levels spaced at established intervals. The platen is removably attached to a predetermined position of the MFP 100 so that the front side or the back side of the platen faces the document table 101a. While viewing the reference chart screen, the user removes the platen whose front side faces the document table 101a from the predetermined position of the MFP 100, turns the platen upside down, and attaches the platen so that the back side of the platen faces the document table 101a. Consequently, if the user sets up the platen on a sheet of paper to read image data on the paper, the reference chart provided on the back side of the platen is arranged on the paper (FIG. 5: S107).

Although the platen is configured to be removably attached to the predetermined position of the MFP 100 in the above description, there is no need to use the platen for the reference chart. For example, a reference chart prepared independently from the platen may be set on a side of the MFP 100 as an accessory of the MFP 100, and a user puts the reference chart on paper only when in a thickness detection mode.

Then, if the user instructs the MFP 100 to read image data through operation of keys with the reference chart laid over the paper, the thickness detection unit 403 receives the instruction and causes the image reading unit 103 to read the image data of the paper over which the reference chart is laid (FIG. 5: S108).

Figure 7A:
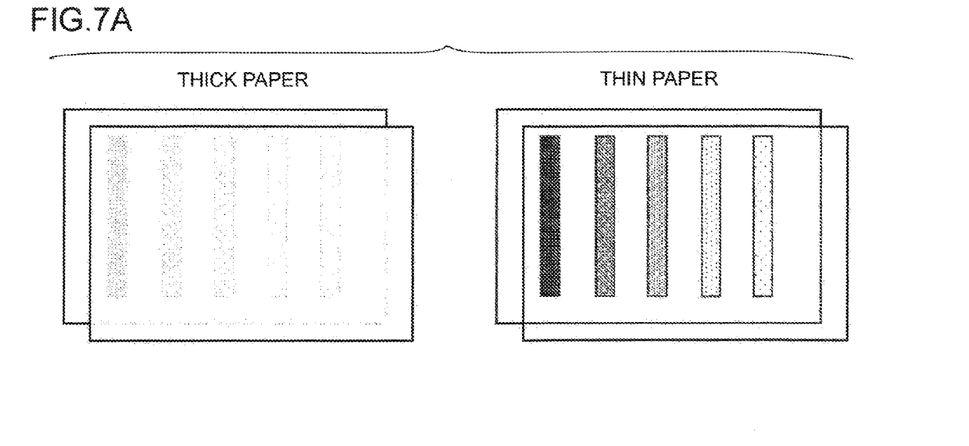
FIG. 7A illustrates the relationship between the reference chart and thicknesses of paper.

After the image data of the paper has been completely read, the thickness detection unit 403 detects black densities of the image data that corresponds to the black densities of the reference chart (FIG. 5: S109). In the case of thick paper, as shown in FIG. 7A, patterns of black densities reduced in proportion to the high transmittance of the paper are seen on the image data of the paper over which the reference chart is laid. In FIG. 7A, among the five levels of black densities of the reference chart, only the highest level of black density is slightly seen. On the other hand, in a case of thin paper, patterns of black densities reduced in proportion to the low transmittance of the paper are seen on the image data of the paper over which the reference chart is laid. In FIG. 7A, all the black densities corresponding to the five levels of black densities of the reference chart are seen. The thickness detection unit 403 utilizes this phenomenon. Specifically, the thickness detection unit 403 detects black densities of image data on the paper at the same locations of black densities of the reference chart.

Upon detecting the black densities on the image data, the thickness detection unit 403 calculates the difference between the black densities of the reference chart and the detected black densities on the image data. In the above case, since the reference chart includes five levels of black densities, the thickness detection unit 40 calculates the differences between the black densities of the reference chart and the detected black densities of the image data, respectively, for every level, and calculates the average of the differences in order to improve the paper thickness detection accuracy. The thickness detection unit 403 subsequently associates the calculated density difference with one of a plurality of transmittances (table) indicating preset thicknesses of paper in a stepwise manner, thereby detecting (deciding) the thickness of the paper (FIG. 5: S110).

For example, a density difference associated with a transmittance from 0% to 25% is associated with a range called a "thickest level" denoting that the paper is thickest, a density difference associated with a transmittance from 25% to 50% is associated with a range called a "thick level" denoting that the paper is thick, a density difference associated with a transmittance from 50% to 75% is associated with a range called a "thin level" denoting that the paper is thin, and a density difference associated with a transmittance from 75% to 100% is associated with a range called a "thinnest level" denotes that the paper is thinnest.

The thickness detection unit 403 associates the calculated density difference with a transmittance and defines a thickness associated with the transmittance as the thickness of the paper. This enables detection of the thickness of paper only by performing image processing without using media sensors or the like.

After detecting the thickness of the paper, the thickness detection unit 403 notifies a paper-type setting unit 404 of the resultant thickness. The paper-type setting unit 404 receives the notification and then sets the type of the paper associated with the detected surface property and thickness of the paper (FIG. 5: S111).

The paper-type setting unit 404 can set the type of the paper by any type of method, for example, by the following method. Firstly, the paper-type setting unit 404 looks up a paper type table stored in advance.

Figure 7B:
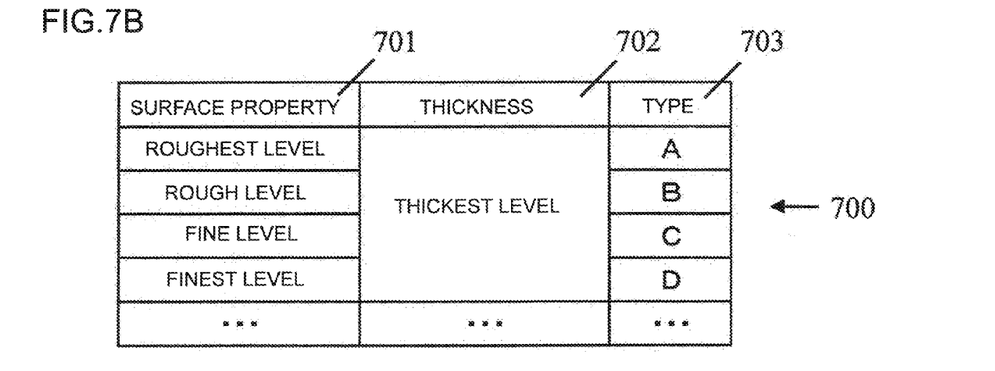
FIG. 7B shows an example of a paper type table.

The paper type table 700 includes, as shown in FIG. 7B, a surface property item 701 listing surface properties of paper, a paper thickness item 702 listing thicknesses of paper, and a paper type item 703 uniquely determined by the surface property item 701 and paper thickness item 702 and listing types of paper. These items are associated with one another in the stored table.

The paper-type setting unit 404 associates the detected surface property and thickness of the paper with the surface property item 701 and paper thickness item 702 in the table 700 to determine the type of the paper from the preset paper type item 703. Then, the paper-type setting unit 404 changes the setting conditions relating to the image forming unit 109 and paper transportation in accordance with the determined paper type. Accordingly, appropriate image formation and paper transportation suitable for the type of paper can be achieved, and therefore failure of the MFP 100 and defective image formation can be prevented.

Upon completion of the paper type setting, the paper-type setting unit 404 notifies the display acceptance unit 401 that the paper type has been set. The display acceptance unit 401 receives the notification and then displays an operation screen to accept input of setting conditions for a copy function or the like by the user. This can prevent setting errors of paper type by user and machine errors. Therefore, the copy function to be performed afterward can produce copies with high image quality.

In addition, for example, the paper-type setting unit 404 can be configured to display a screen to instruct the user to return the back side of the platen to the front side in order to prevent the reference chart on the back side of the platen from appearing on an original document in modes other than the paper-type detection mode.

As described above, the present disclosure is characterized by including the surface-property detection unit 402 that detects a surface property of paper by performing image processing on image data of the paper read by the image reading unit 103, the thickness detection unit 403 that detects the thickness of paper by causing the image reading unit 103 to read image data of the paper over which a reference chart having predetermined black densities is laid and referring to the difference between the black densities of the reference chart and the black densities on the image data, and the paper-type setting unit 404 that sets the type of the paper associated with the detected surface property and thickness of the paper. According to this disclosure, optimal paper settings can be achieved without increased cost. Consequently, users can reliably avoid burdensome manual procedures for selecting paper types and errors involving paper type setting, and also can obtain satisfactory output images because images can be formed in a suitable manner according to the types of paper.

The image reading unit 103 according to the embodiment of the disclosure is not particularly limited to a specific type of image reading unit and can be, for example, a CCD, CIS, or the like, as long as it can read image data.

Although, in the embodiment of the disclosure, an image forming apparatus including an image reading unit 103 has been described as a paper type detection apparatus; however, the paper type detection apparatus does not need to be an image forming apparatus, and the present disclosure can be applied to any apparatus with the image reading unit 103.

Furthermore, although the MFP 100 is configured to include the various units in the present embodiment, a configuration may include provision of a storage medium that enables storage of a program for implementing the respective units in the storage medium. In this configuration, the program is read out by the MFP 100 to thereby implement the respective units by the MFP 100. In this case, the program itself that is read out of the storage medium may embody the operation and effect of the present disclosure. Furthermore, provision is also possible of the steps for realizing each unit as a method stored in a hard disk.

As described above, the paper type detection apparatus and the method for detecting the type of paper according to the present disclosure are useful for not only multifunction peripherals, but also copiers, printers and so on, and can be effectively used to optimally set the paper type without increased cost.

What is claimed is:

1. A paper type detection apparatus comprising: an image reading unit that reads an image of an original document and generates image data corresponding to the original document; and a processor, wherein the processor executes a surface-property detection unit that detects a surface property of paper by performing image processing on first image data of the paper read by an image reading unit; a thickness detection unit that detects the thickness of the paper based on a difference between a black density appearing on a second image data generated by the image reading unit reading the paper over which a reference chart having a plurality of patterns of a black density which are different from each other is laid, and a black density of the reference chart; and a paper-type setting unit that sets the type of the paper associated with the detected surface property and thickness of the paper, wherein the surface-property detection unit detects the surface property of the paper by performing an enhancement process and a binarization process on the first image data of the paper, calculating the ratio of white data to the processed data, and associating the calculated ratio of white data with one of a plurality of ranges, which indicate preset surface properties of paper in a stepwise manner.

2. The paper type detection apparatus according to claim 1, wherein the reference chart is composed of the plurality of patterns of the black density and is formed on the back side of a platen that faces a document table.

3. The paper type detection apparatus according to claim 1, wherein the thickness detection unit detects the thickness of the paper by calculating the difference between the black density appearing on the second image data of the paper at the same location of the black density of the reference chart and the black density of the reference chart, and associating the calculated density difference with one of a plurality of transmittances, which indicate preset thicknesses of paper in a stepwise manner.

4. A method for detecting the type of paper comprising: generating a first image data by reading an image data of a paper; detecting a surface property of paper by: performing an enhancement process and a binarization process on the first image data of the paper; calculating the ratio of white data to the processed data and associating the calculated ratio of white data with one of a plurality of ranges; associating the calculated ratio of white data with one of a plurality of ranges, which indicate preset surface properties of paper in a stepwise manner; generating a second image data by reading a paper over which a reference chart having a plurality of patterns of the black density which are different from each other; detecting the thickness of the paper by referring to the difference between the black density of the reference chart and the black density appearing on the second image data; and setting the type of the paper associated with the detected surface property and thickness of the paper.

* * * * *